(12) United States Patent
Lin et al.

(10) Patent No.: US 9,537,122 B2
(45) Date of Patent: Jan. 3, 2017

(54) FIXING SHEET AND ELECTRONIC APPARATUS

(71) Applicant: HTC Corporation, Taoyuan County (TW)

(72) Inventors: Che-Kai Lin, Taoyuan County (TW); Chih-Hao Huang, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 708 days.

(21) Appl. No.: 13/659,871

(22) Filed: Oct. 24, 2012

(65) Prior Publication Data

US 2014/0113505 A1    Apr. 24, 2014

(51) Int. Cl.
*H01M 2/10* (2006.01)
*H01M 2/00* (2006.01)
*H04M 1/02* (2006.01)

(52) U.S. Cl.
CPC ............. *H01M 2/1016* (2013.01); *H01M 2/00* (2013.01); *H01M 2/1022* (2013.01); *H04M 1/0262* (2013.01); *Y10T 29/49822* (2015.01)

(58) Field of Classification Search
CPC ......... H01M 2/1016; H01M 2/10; H01M 2/00
See application file for complete search history.

(56) References Cited

U.S. PATENT DOCUMENTS

| | | | |
|---|---|---|---|
| 4,977,042 A | 12/1990 | Chiyajo et al. | |
| 5,763,112 A | 6/1998 | Redford | |
| 8,173,290 B2 | 5/2012 | Kim et al. | |
| 8,173,293 B2 | 5/2012 | Kim | |
| 2007/0065718 A1* | 3/2007 | Moon | H01M 2/021 429/185 |
| 2009/0274953 A1 | 11/2009 | Myers et al. | |
| 2010/0151318 A1* | 6/2010 | Lopatin et al. | 429/163 |
| 2010/0297494 A1* | 11/2010 | Chen | H01M 2/021 429/179 |
| 2011/0210954 A1 | 9/2011 | Murphy et al. | |

FOREIGN PATENT DOCUMENTS

| | | |
|---|---|---|
| TW | M316255 | 8/2007 |
| TW | M409250 | 8/2011 |

OTHER PUBLICATIONS

"Office Action of Taiwan Counterpart Application", issued on Jul. 28, 2015, p. 1-p. 9, in which the listed references were cited.

* cited by examiner

*Primary Examiner* — Jonathan G Leong
*Assistant Examiner* — Seenam Agbetiafan
(74) *Attorney, Agent, or Firm* — Jianq Chyun IP Office

(57) ABSTRACT

A fixing sheet adapted for fixing a battery to a body of an electronic apparatus is provided. The fixing sheet includes a structure layer having a first portion, a second portion and a split line. The first portion is adapted to be adhered to the battery. The second portion is structurally connected to the first portion and adapted to be adhered to the body. The split line is located at a common border of the first portion and the second portion. The first portion is capable of being forced relative to the second portion once the battery is forced relative to the body, so as to separate the first portion and the second portion along the split line. An electronic apparatus having the fixing sheet is also provided.

12 Claims, 3 Drawing Sheets

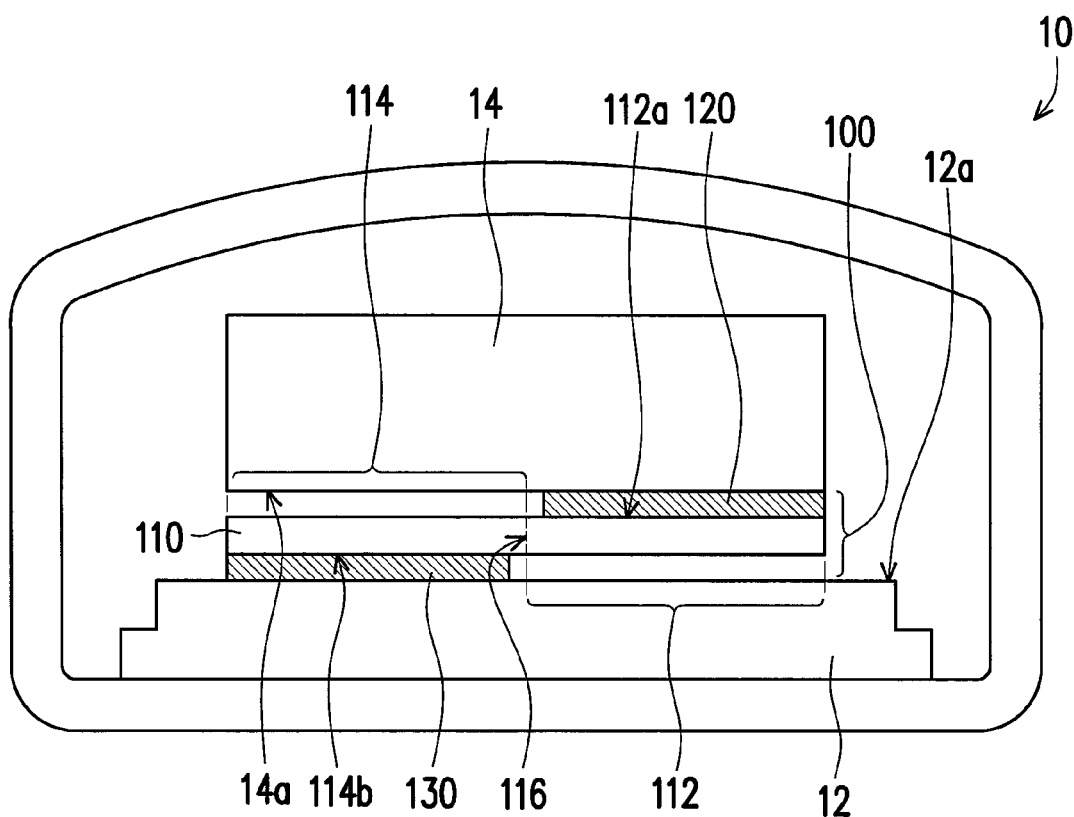

FIG. 2

| Detach the battery from the body by applying force relative to the second portion to the first portion through the battery and the body to structurally separate the first portion and the second portion along the split line | — S301 |
| Remove the second portion remained on the body surface and the first portion remained on the battery surface | — S302 |
| Re-adhere another fixing sheet to the battery, and re-fix the battery to the body through the fixing sheet | — S303 |

FIG. 3

FIXING SHEET AND ELECTRONIC APPARATUS

BACKGROUND OF THE INVENTION

Field of the Invention

The invention relates to an electronic apparatus. More particularly, the invention relates to an electronic apparatus having an embedded battery.

Description of Related Art

In current information era, human beings by degrees tend to rely on consumer electronics devices. The electronic products such as mobile phones, smart phones and tablet PC have pervaded everywhere. Therefore, consumer electronics devices and people nowadays are closely bonded together in daily life. Electronic devices nowadays are generally included with a battery configured to provide power required for system operations, so as to allow users to carry and use the devices anywhere.

Generally, the battery of the electronic device is disposed within its body, and no plastic protective shell is covered on a core of the battery so as to reduce overall thickness of the electronic device. However, the battery must be removed by maintenance personnel to proceed with maintenance for the electronic device. The battery without being protected by plastic protective shell may easily be deformed under force applied during the process of detaching the battery, so as to further increases maintaining costs.

SUMMARY OF THE INVENTION

The invention is directed to a fixing sheet capable of fixing a battery to a body, and preventing the battery from deformation caused by external forces during the process of detaching the battery from the body.

The invention provides a electronic apparatus, in which a battery may be fixed to the a body through a fixing sheet and the battery from deformation caused by external forces during the process of detaching the battery from the body may be prevented.

The invention provides a method for detaching a battery, the method may be used to prevent the battery from deformation caused by external forces during the process of detaching the battery.

The invention provides a fixing sheet adapted for fixing a battery to a body of an electronic apparatus, the fixing sheet includes a structure layer, the structure layer has a first portion, a second portion and a split line. The first portion is adapted to be adhered to the battery. The second portion is structurally connected to the first portion and adapted to be adhered to the body. The split line is located at a common border of the first portion and the second portion. The first portion is capable of being forced relative to the second portion once the battery is forced relative to the body, so as to separate the first portion and the second portion along the split line.

The invention provides an electronic apparatus, including a body, a battery and a fixing sheet. The battery is disposed within the body. The fixing sheet is disposed between the body and the battery, the fixing sheet includes a structure layer, the structure layer has a first portion, a second portion and a split line. The first portion is adapted to be adhered to the battery, the second portion is structurally connected to the first portion and adapted to be adhered to the body, and the split line is located between the first portion and the second portion. The first portion is capable of being forced relative to the second portion once the battery is forced relative to the body, so as to separate the first portion and the second portion along the split line.

The invention provides a method for detaching and attaching a battery, adapted for detaching a battery from within a body of an electronic apparatus, a fixing sheet is disposed between the body and the battery, the fixing sheet includes a structure layer having a first portion, a second portion and a split line, the first portion is adhered to the battery, the second portion is structurally connected to the first portion and adhered to the body, the split line is located at a common border of the first portion and the second portion. The method for detaching and attaching the battery includes: detaching the battery from the body by applying a force relative to the second portion to the first portion through the battery and the body to structurally separate the first portion and the second portion along the split line.

In view of above, the battery of the electronic apparatus of the invention is capable of being fixed together with the body through the fixing sheet. In the fixing sheet, the first portion is adhered to the battery, the second portion is adhered to the body, and the split line is located between the first portion and the second portion. The first portion is capable of being forced relative to the second portion once the battery is forced relative to the body, so as to separate the first portion and the second portion along the split line, so as to separate the battery from the body. During the process of detaching the battery from the body of the electronic apparatus, despite that the fixing sheet is destroyed, the battery may substantially remain its original appearance. As a result, not only that the battery may be prevented from damages, maintaining costs of the electronic apparatus may also be reduced.

To make the above features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 2 is a schematic view of an electronic apparatus using the fixing sheet of FIG. 1B according to an embodiment of the invention.

FIG. 3 is a flowchart illustrating a method for detaching and attaching the battery of the electronic apparatus of FIG. 2.

DESCRIPTION OF THE EMBODIMENTS

Figure 1A:
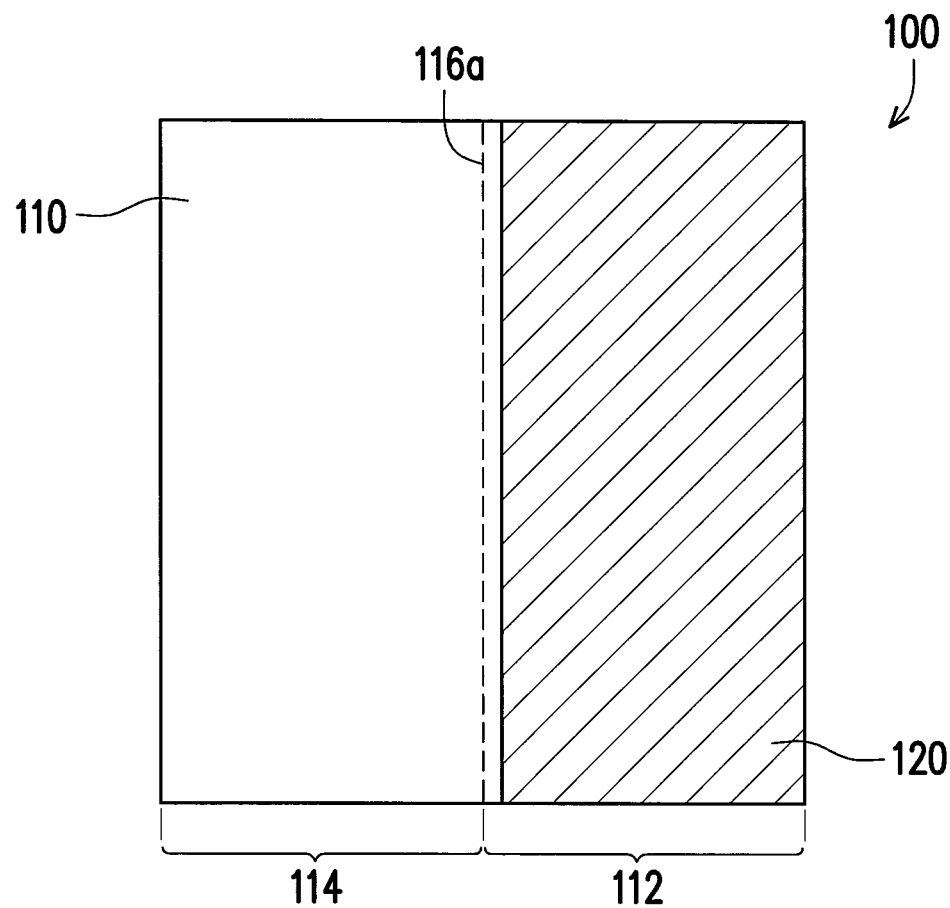
FIG. 1A is a top view of a fixing sheet according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Figure 1B:
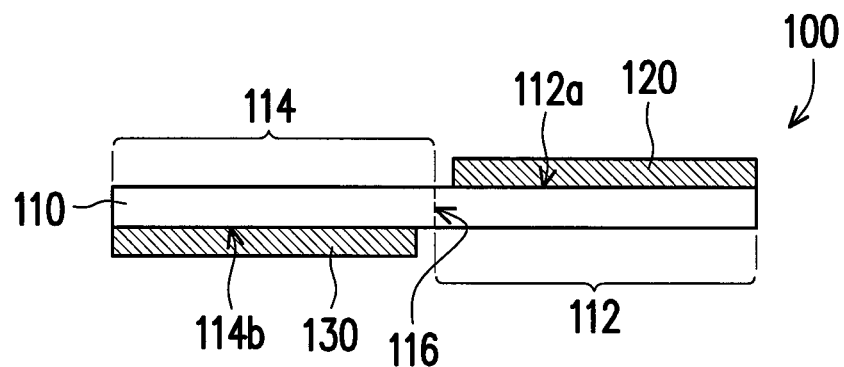
FIG. 1B is a front view of the fixing sheet of FIG. 1A.

FIG. 1A is a top view of a fixing sheet according to an embodiment of the invention. FIG. 1B is a front view of the fixing sheet of FIG. 1A. FIG. 2 is a schematic view of an electronic apparatus using the fixing sheet of FIG. 1B according to an embodiment of the invention. Referring to FIGS. 1A, 1B, and 2 together. An electronic apparatus 10 of the present embodiment includes a body 12, a battery 14 and a fixing sheet 100. The battery 14 is disposed within the body 12. The fixing sheet 100 is disposed between the body 12 and the battery 14, the fixing sheet 100 includes a structure layer 110, the structure layer 110 has a first portion 112, a second portion 114 and a split line 116. The first portion 112 is adapted to be adhered to the battery 14. The second portion 114 is structurally connected to the first portion 112 and adapted to be adhered to the body 12. The split line 116 is located at a common border of the first portion 112 and the second portion 114. The first portion 112 is capable of being forced relative to the second portion 114 once the battery 14 is forced relative to the body 12, so as to separate the first portion 112 and the second portion 114 along the split line 116.

In the present embodiment, the battery 14 of the electronic apparatus 10 may be fixed together with the body 12 through the fixing sheet 100. In the structure layer 110 of the fixing sheet 100, the first portion 112 is adhered to the battery 14, the second portion 114 is adhered to the body 12, and the split line 116 is located between the first portion 112 and the second portion 114. When the battery 14 is detached from the body 12 by maintenance personal for maintenance of the electronic apparatus 10, the fixing sheet 100 is capable of preventing the battery 14 from deformation or damages caused by external forces, so as to maintain overall appearance integrity of the battery 14 during the detaching process.

The body 12 may be, for example, composed by a circuit board and a housing of the electronic apparatus 10. The battery 14 may be adhered on the body 12 by, for example, adhering the fixing sheet 100 to the circuit board or a shielding case of the circuit board. In addition, the battery 14 may also be adhered to a support chassis within the housing. Structure of the body 12 and methods for adhering the battery 14 to the body 12 are not particularly limited in the invention.

Referring to the fixing sheet 100 disposed between the battery 14 and the body 12, in which the structure layer 110 includes a metal thin film, a MYLAR® (registered trademark owned by Dupont Tejjin Films) or a paper, wherein MYLAR® may be a polyester film such as polyethylene terephthalate film. According to the present embodiment, the structure layer 110 is made of for example, a copper foil. In the case where the structure layer 110 is made of the metal thin film, the structure layer 110 is capable of conducting heat generated during operations of the battery 14 to the body 12, so as to ensure that the battery 14 may operate normally. However, materials of the fixing sheet 100 are not particularly limited in the invention.

Structure characteristics of the fixing sheet 100 according to the present embodiment are further described as follows. Referring to FIGS. 1A and 1B, in the structure layer 110 of the fixing sheet 100, the split line 116 located between the first portion 112 and the second portion 114 may be composed by, for example, a plurality of slits 116a successively arranged in series with a fixed interval. Said slits 116a are located on the common border of the first portion 112 and the second portion 114, such that the common border of the first portion 112 and the second portion 114 may become a region having a weakest structure strength in the structure layer 110. Therefore, the first portion 112 is capable of being separated from the second portion 114 along the split line 116 once the battery 14 is forced relative to the body 12. In the present embodiment, the split line 116 composed by the slits 116a is arranged in a straight line. However, types of the split line 116 are not particularly limited in the invention, that is, the invention does not limit the slits 116a of the split line 116 only to be arranged in a straight line.

In addition, according to the present embodiment, the fixing sheet 100 further includes a first adhesive layer 120 and a second adhesive layer 130. The first adhesive layer 120 is disposed on the first portion 112, the first portion 112 is adapted to be adhered to the battery 14 through the first adhesive layer 120. The second adhesive layer 130 is disposed on the second portion 114, the second portion 114 is adapted to be adhered to the body 12 through the second adhesive layer 130. More specifically, in the present embodiment, the body 12 has a body surface 12a and the battery 14 has a battery surface 14a. The first adhesive layer 120 is disposed on a first surface 112a of the first portion 112. The second adhesive layer 130 is disposed on a second surface 114b of the second portion 114. The first surface 112a and the second surface 114b are disposed on two surfaces opposite to each other.

Figure 4A:
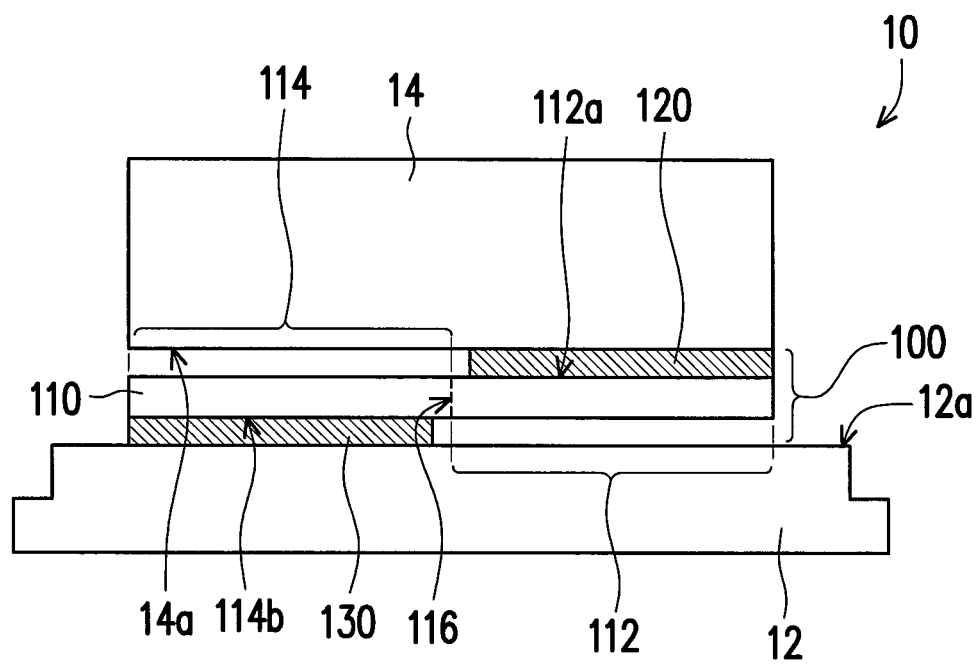
FIGS. 4A and 4B are schematic views respectively illustrating the electronic apparatus of FIG. 2 before the battery is detached and after the battery is detached.
Figure 4B:
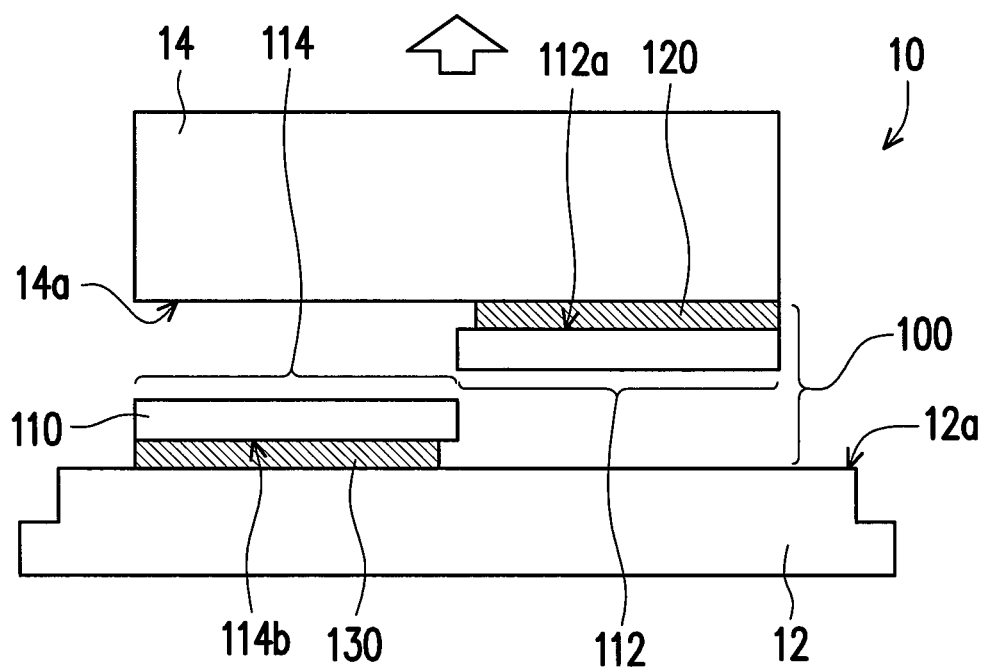

FIG. 3 is a flowchart illustrating a method for detaching and attaching the battery of the electronic apparatus of FIG. 2. FIGS. 4A and 4B are schematic views respectively illustrating the electronic apparatus of FIG. 2 before the battery is detached and after the battery is detached. Referring to FIGS. 3, 4A and 4B, after the housing outside of the battery 14 is detached from the body 12 by maintenance personal for maintenance of the electronic apparatus 10 using the fixing sheet 100 of the present embodiment, the electronic apparatus 10 is in a state as shown in FIG. 4A. In step S301, the battery 14 is detached from the body 12 by applying force relative to the second portion 114 to the first portion 112 through the battery 14 and the body 12 to structurally separate the first portion 112 and the second portion 114 along the split line 116 (as shown in FIG. 1A).

More specifically, in FIG. 4A, the battery 14 is forced relative to the body 12, such the first portion 112 adhered to the battery 14 in the fixing sheet 100 may be forced relative to the second portion 114. Since the split line 116 (as shown in FIG. 1A) located on the common border between the first portion 112 and the second portion 114 is the region having the weakest structure strength in the structure layer 110 which can be easily broke, once the battery 14 is forced relative to the body 12, the structure layer 110 may be broke along the split line 116 to separate the first portion 112 from the second portion 114.

Referring to FIG. 4B, once the battery 14 and the body 12 are separated from each other, the first portion 112 of the fixing sheet 100 is remained on the battery surface 14a of the battery 14, whereas the second portion 114 is remained on the body surface 12a of the body 12. After maintenance of the electronic apparatus 10 is completed, step S302 may be performed to remove the second portion 114 remained on the body surface 12a and the first portion 112 remained on the battery surface 14a. Next, in step S303, another fixing sheet 100 may be re-adhered to the battery 14, such that the battery 14 may be re-fixed to the body 12.

Based on above, the invention may fix a battery to a body by disposing a fixing sheet between the battery and the body. Once the battery is fixed to the body, a first portion and a second portion of a structure layer on the fixing sheet may respectively being adhered to the battery and the body. A split line is located at a common border of the first portion and the second portion. Accordingly, the first portion is capable of being forced relative to the second portion once the battery is forced relative to the body, so as to separate the first portion and the second portion along the split line. The formation of the split line may be, for example, composed by a plurality of slits disposed on the fixing sheet, said slits allows the split line to become a region have a weakest structure strength in the structure layer which can be easily broke. In addition, a copper foil may be used as a material of the fixing sheet, such that dissipation efficiency of the battery may also be further increased. As a result, during the process of detaching the battery from the electronic apparatus, the invention may reduce overall maintaining costs of the electronic apparatus by preventing the battery being deformed by external forces.

Although the invention has been described with reference to the above embodiments, it is apparent to one of the ordinary skill in the art that modifications to the described embodiments may be made without departing from the spirit of the invention. Accordingly, the scope of the invention will be defined by the attached claims not by the above detailed descriptions.

What is claimed is:

1. A fixing sheet, adapted for fixing a battery to a body of an electronic apparatus, the fixing sheet comprises:
    a structure layer having a first surface and a second surface opposite to the first surface, wherein the structure layer comprises a first portion, a second portion and a weak portion having weaker structural strength than the first portion and the second portion, the second portion is structurally connected to the first portion through the weak portion, the first portion, the second portion and the weak portion share the first surface, and the first portion, the second portion and the weak portion share the second surface;
    a first adhesive layer disposed on the first surface of the first portion and not on the first surface of the second portion; and
    a second adhesive layer disposed on the second surface of the second portion and not on the second surface of the first portion.

2. The fixing sheet of claim 1, wherein the weak portion comprises a plurality of slits successively arranged in series with a fixed interval.

3. The fixing sheet of claim 2, wherein the plurality of slits are arranged in a straight line.

4. The fixing sheet of claim 1, wherein the structure layer comprises a metal thin film, a polyethylene terephthalate film or a paper.

5. The fixing sheet of claim 1, wherein the structure layer is a copper foil.

6. The fixing sheet of claim 1, wherein the structure layer is capable of conducting heat generated by the battery to the body.

7. An electronic apparatus, comprising:
    a body;
    a battery disposed within the body; and
    a fixing sheet disposed between the body and the battery, the fixing sheet comprises:
    a structure layer having a first surface and a second surface opposite to the first surface, wherein the structure layer comprises a first portion, a second portion and a weak portion having weaker structural strength than the first portion and the second portion, the second portion is structurally connected to the first portion through the weak portion, the first portion, the second portion and the weak portion share the first surface, and the first portion, the second portion and the weak portion share the second surface;
    a first adhesive layer disposed on the first surface of the first portion and not on the first surface of the second portion; and
    a second adhesive layer disposed on the second surface of the second portion and not on the second surface of the first portion.

8. The electronic apparatus of claim 7, wherein the weak portion comprises a plurality of slits successively arranged in series with a fixed interval.

9. The electronic apparatus of claim 8, wherein the plurality of slits are arranged in a straight line.

10. The electronic apparatus of claim 7, wherein the structure layer comprises a metal thin film, a polyethylene terephthalate film or a paper.

11. The fixing sheet of claim 7, wherein the structure layer is a copper foil.

12. The fixing sheet of claim 7, wherein the structure layer is capable of conducting heat generated by the battery to the body.

* * * * *